July 16, 1935.  W. A. HART  2,008,208

BROACHING MACHINE FOR SHIFT RODS

Filed July 16, 1931   3 Sheets-Sheet 1

INVENTOR
William A. Hart.
BY
Harness, Dickey, Pierce & Hann.
ATTORNEYS.

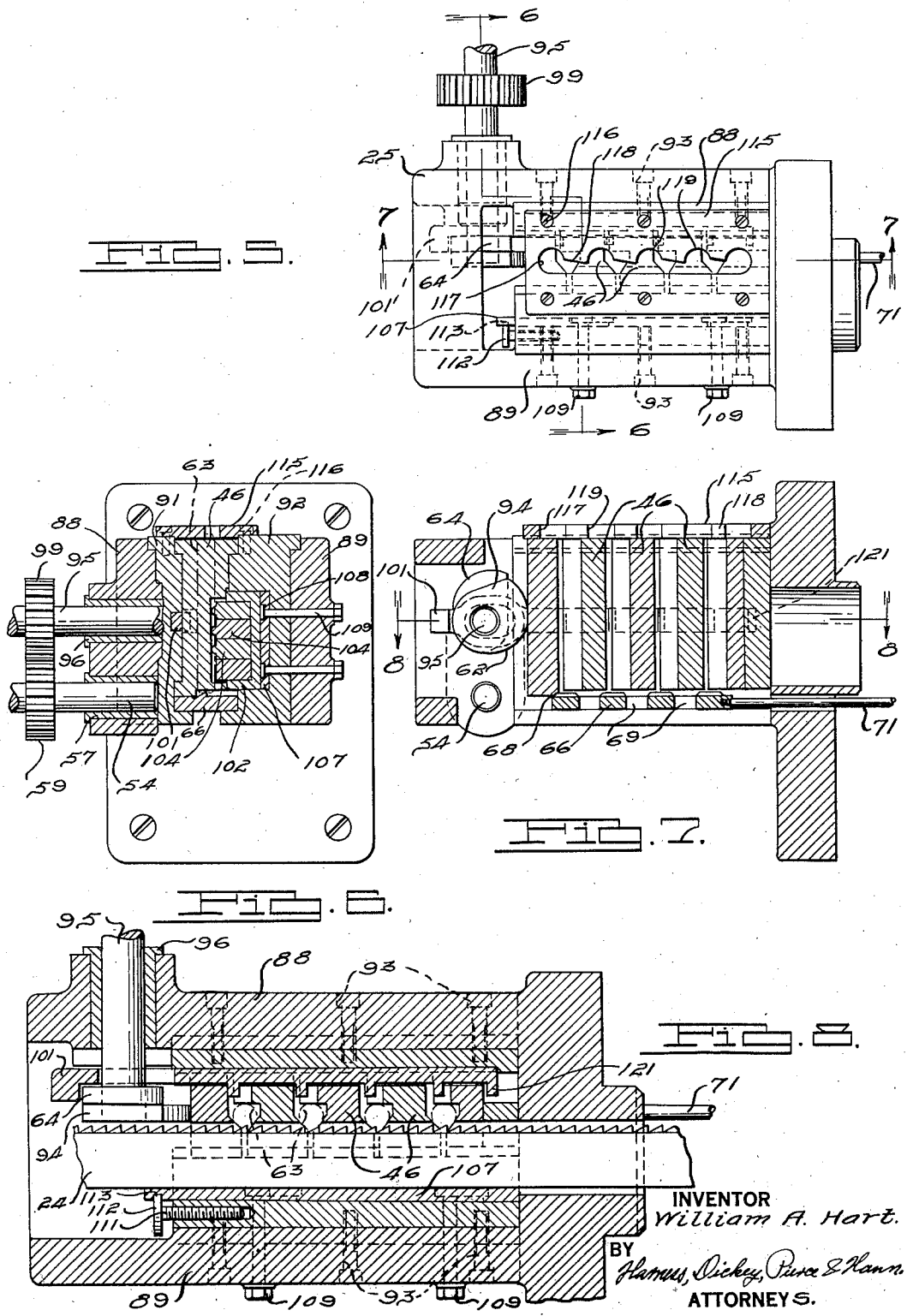

July 16, 1935.   W. A. HART   2,008,208
BROACHING MACHINE FOR SHIFT RODS
Filed July 16, 1931   3 Sheets-Sheet 3
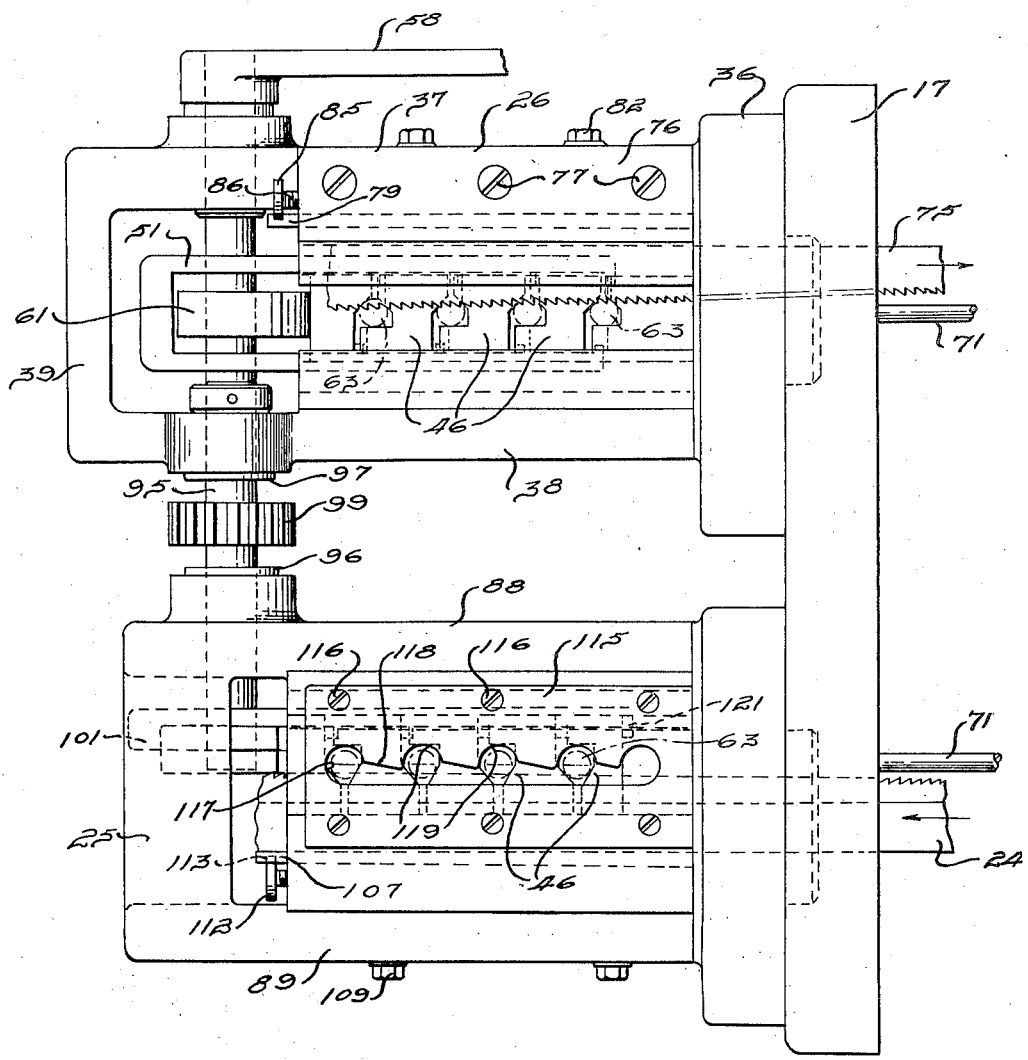
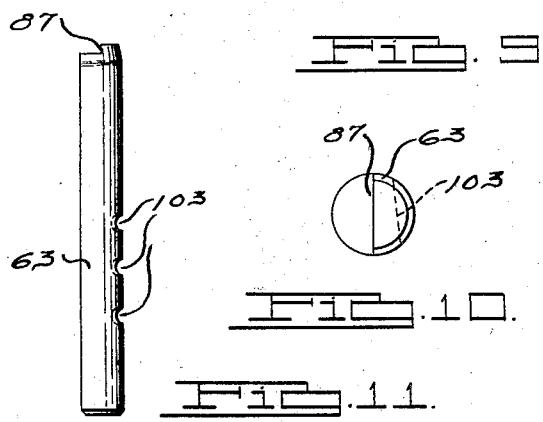
INVENTOR
William A. Hart.
BY
Hanson, Dickey, Pierce & Hann.
ATTORNEYS.

Patented July 16, 1935

2,008,208

UNITED STATES PATENT OFFICE 2,008,208

BROACHING MACHINE FOR SHIFT RODS

William A. Hart, Detroit, Mich., assignor to Colonial Broach Company, a corporation of Michigan Application July 16, 1931, Serial No. 551,089

10 Claims. (Cl. 90—33)

This invention relates to broaching machines and particularly to a broaching machine for cutting notches which are predeterminately related to each other in the sides and ends of a rod.

The main objects of this invention are: to provide a broaching machine having pairs of broaching cutters extending through work receiving and clamping heads, which are simultaneously actuated in opposite directions controlled by the movement of a single control handle; to provide each work piece receiving head with a chamber having a plurality of spaced jaws between which work pieces may be disposed and clamped when the jaws and work pieces are moved into contiguous relation to each other; to provide positioning means on one of said heads for locating the notched work pieces circumferentially in the spaces in the chamber; to provide an actuating member for the jaws which progressively move them from clamped position to release all of the work pieces therebetween which drop from the chamber when the support therefor has been moved from across the bottom of the clamping head; and to provide a single control handle for positioning the jaw members of both heads, by actuating the jaw members into clamped position in one head during the time the jaw members are moved to unclamped position in the other head.

Figure 1:
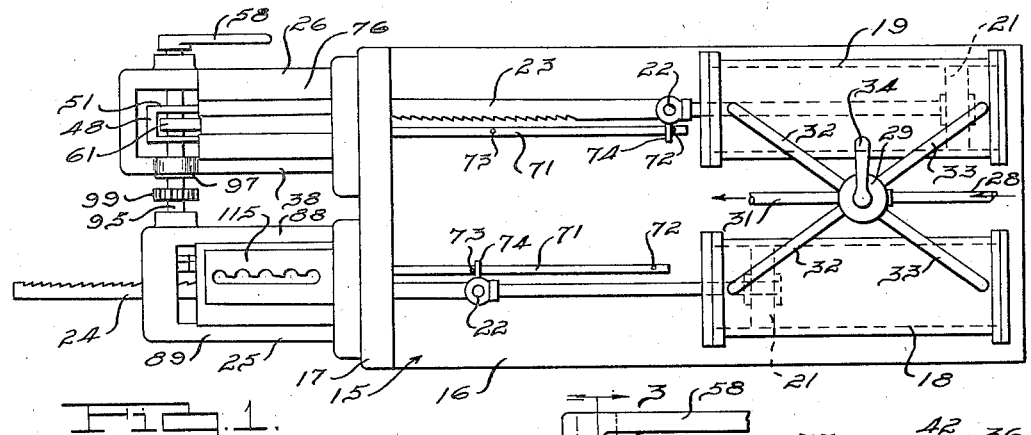
Figure 2:
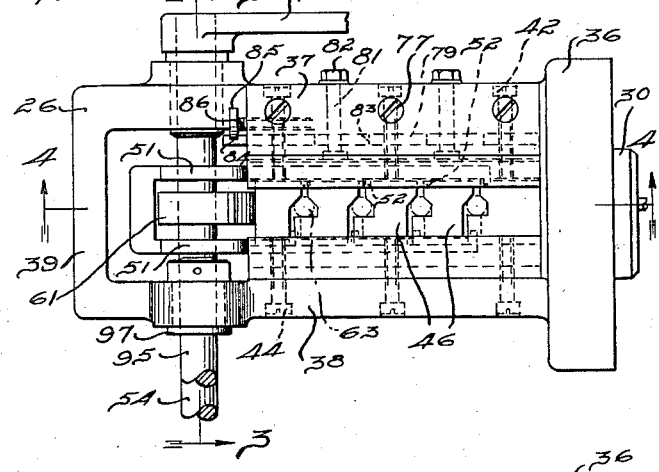
Figures 3, 4:
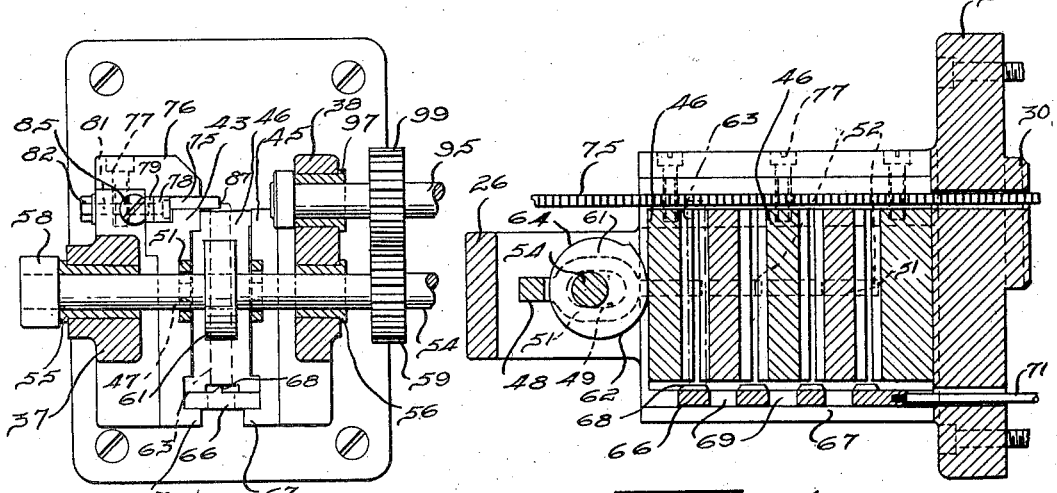

Other objects and features of novelty of my invention will be either specifically pointed out or will become apparent when referring, for a better understanding of my invention, to the following description in conjunction with the accompanying drawings, wherein:

Figure 1 is a plan view of a broaching machine which embodies features of my invention, Fig. 2 is an enlarged plan view of one of the work piece clamping heads illustrated in Fig. 1, Fig. 3 is a sectional view of the structure illustrated in Fig. 2, taken on the line 3—3 thereof, Fig. 4 is a sectional view of the structure illustrated in Fig. 2, taken on the line 4—4 thereof, Fig. 5 is an enlarged view of the head illustrated in Fig. 1 which is positioned adjacent to the head illustrated in Fig. 2, Fig. 6 is a sectional view of the structure illustrated in Fig. 5, taken on the line 6—6 thereof, Fig. 7 is a sectional view of the structure illustrated in Fig. 5, taken on the line 7—7 thereof, Fig. 8 is an enlarged sectional view of the structure illustrated in Fig. 7 taken on the line 8—8 thereof, Fig. 9 is an enlarged plan view of the combined work piece clamping heads illustrated in Figs. 2 and 5, Fig. 10 is a plan view of a work piece as machined by the broaching cutters in the work piece supporting heads illustrated in Fig. 9, and Fig. 11 is an elevational view of the structure illustrated in Fig. 10.

My invention comprises in general a broaching machine 15 which cuts related notches in the ends and sides of rods which are longitudinally and circumferentially spaced thereon. The rods herein shown and described, are provided in the nature of shift rods employed in automotive vehicle transmissions for controlling the position and manipulation of the shift lever of the vehicle. It is, however, to be understood that my machine is not limited to this particular application but may be employed to cut notches on other types of work pieces. The machine is provided with a suitable cradle 16 having a face plate 17 mounted on the front end thereof and a pair of hydraulic rams 18 and 19 mounted on the rear portion, as illustrated in Fig. 1. Reciprocable pistons 21 are provided in the rams 18 and 19, the front ends of the rods thereof being pivotally connected at 22 to broaching cutters 23 and 24. Work piece supporting heads 25 and 26 are mounted on the front surface of the face plate 17 in a position to have the broaching cutters 23 and 24 pass therethrough when the pistons 21 are reciprocated, for machining work pieces which are clamped within the supporting heads.

Referring to the cylinders 18 and 19, an inlet fluid supply line 28 is connected to one side of a valve 29 which has an outlet conductor 31 attached thereto on the opposite side of the valve from that to which the inlet conductor 28 is attached. Suitable conductors 32 and 33 connect the valve 29 to the front and rear ends, respectively, of the cylinders 18 and 19 for supplying a fluid to both sides of the pistons 21. A handle 34 is employed for actuating the valve for conducting the fluid to the front end of the ram 18, as shown in the figure, and also to the rear end of the adjacent ram 19. When the handle 34 is moved to its opposite position the conductor 32 of the cylinder 19 and the conductor 33 of the cylinder 18 are connected to the inlet port 28 and the conductor 32 of the cylinder 18 and the conductor 33 of the cylinder 19 is connected to the outlet port 31. In this manner the actuation of the handle 34 controls the movement of the pistons and therefore the broaching cutters 23 and 24 which, in the arrangement of the valve as illustrated and described, reciprocates the cutters in opposite directions, for a reason which will be explained hereinafter.

Referring to Figs. 2, 3 and 4, I have illustrated the work piece supporting head 26 as comprising a body portion 35 having a centering flange 30 thereon which accurately positions the head on the face plate 17 when the end 36 is bolted thereon in a well known manner. Integral with the supporting end 36 are the frontwardly extending sides 37 and 38 which are joined at their end by a portion 39. The body portion thus formed is preferably a casting but it is to be understood that the body portion may be fabricated from a plurality of members or constructed in any other manner known in the art. A plurality of bolts 42 extend through the side 37 and support a side member 43, as illustrated more clearly in Figs. 2 and 3, and bolts 44 extend through the side member 38 for supporting the side portion 45 of the head.

The side portions 43 and 45 form a chamber in which a plurality of clamping jaws 46 are disposed to be movable longitudinally between the side members 43 and 45. Slots 47 are provided in the central body portion of the side portions 43 and 45 for receiving a U-shaped member 48, both sides of which are provided with slots 49 and with extending arms 51 having inwardly projecting tenons 52 which extend between the clamping jaws 46 and are spaced therefrom a distance which progressively increases toward the rearmost jaw.

A shaft 54 is supported in bearings 55 and 56, which are provided in the sides 37 and 38 of the body portion 35, and in a bearing 57 supported on one side of the adjacent head 25. A handle 58 is mounted on one end of the shaft 54 and a gear 59 is mounted on the other end of the shaft, between the bearings 56 and 57. A cam 61 is mounted on the shaft 54 medially between the bearings 55 and 56 in alignment with the clamping jaws 46 and the base portion of the U-shaped member 48. The cam is of the double action type having a surface 62 which engages the frontmost of the clamping jaws 46 when the cam is rotated in a clockwise direction to move all of the jaws rearwardly into clamping relation with work pieces 63 positioned in the spaces therebetween. A second camming surface 64 is provided opposite to the camming surface 62 which is effective when the cam 61 is rotated in a counter-clockwise direction for engaging the base portion of the U-shaped member 48 for moving the members frontwardly as the tenons 52 thereon engage the rear surfaces of the clamping jaws 46 in a progressive manner.

That is to say when the cam 61 is rotated in a counter-clockwise direction the camming surface 62 moves away from the jaws 46 and the cam 64 moves into contact with the base portion of the U-shaped member 48 for moving the member frontwardly. As the member 48 is so moved, the first pair of tenons 52 engages the frontmost jaw 46 and after moving it a predetermined amount the next adjacent pair of tenons 52 engage the next adjacent jaw and as both of the jaws are being moved the next succeeding jaw is picked up and moved therewith by the next adjacent pair of tenons 52 and continuing in like manner until all of the jaws have been moved and substantially equally spaced.

This relative movement of the plurality of jaws 46 spaces the jaws and completely unclamps all the work pieces 63 mounted therebetween. The clockwise rotation of the cam 61 moves the camming surface 64 out of contact with the base portion of the U-shaped member 48 and moves the camming portion 62 into engagement with the frontmost jaw 46 for moving all of the jaws rearwardly until all of the work pieces 63 are clamped therebetween.

A slidable plate 66 is supported by the extending portions 67 provided on the side members 43 and 45, as illustrated in Fig. 3, upon the upper surface of which the jaws 46 are supported. Knife-edge supports 68 are provided on the plate 66 opposite to the spaces between the jaws 46, and apertures 69 are provided between the supports 68 of a diameter sufficient to permit the work pieces 63 to drop therethrough. A rod 71 is attached to one end of the plate 66, as shown in Fig. 4, provided with projecting pins 72 and 73 which extend in the path of movement of an arm 74 mounted on the piston rods of the rams 18 and 19, illustrated in Fig. 1. In this manner, the plate 66 is adjusted relative to the position of the broaching cutters 23 and 24 to have the supports 68 or the apertures 69 positioned opposite to the space between the clamping jaws 46 for either retaining or ejecting, respectively, the work pieces 63 in or from the clamping head.

A broaching cutter 75 is guided between the top surface of the side member 43 and the bottom extending surface of a plate 76, as illustrated in Fig. 3, the plate 76 being retained thereon by bolts 77. I have provided a pair of sloping plates 78 and 79 for regulating the lateral position of the broaching cutter 75 as the plates 78 and 79 are adjusted laterally relative to each other. The plate 78 is provided with recesses for receiving the heads of bolts 81 on which nuts 82 are threaded for clamping the two members 78 and 79 into adjusted position. The member 79 is provided with slots 83 through which the bolts 81 extend, and has a recess 84 on its front end in which the head 85 of a screw 86 registers for adjusting the position of the member 79 as the screw 86 is threaded into or out of the side 37 of the body portion 35. In this manner the lateral position of the broaching cutter 75 is adjusted for cutting a notch 87 of predetermined depth in an end of the work pieces 63 during a single passage of the broaching cutter 23 thereacross.

When the broaching cutter 23 reaches the end of its stroke, the pin 72 on the rod 71 is engaged by the arm 74 of the ram, to move the plate 66 rearwardly to have the apertures 69 thereof positioned opposite to the ends of the work pieces. When the handle 58 is operated in a counter-clockwise direction the jaws 46 are released and moved frontwardly as the camming surface 64 engages the base of the U-shaped member 48, to release all of the work pieces and permit them to drop from the openings 69 in the plate.

The work pieces 63 have a notch 87 machined in their ends by the above described operation and are transferred to the work piece receiving head 25, illustrated in Fig. 1 and shown in section and enlarged in Figs. 5 to 8 inclusive. The head 25 is similar to the head 26, being provided with frontwardly extending sides 88 and 89 having guiding members 91 and 92 which are supported thereon by bolts 93. The members 91 and 92 support and guide the plurality of jaws 46, provided in the head 25, which are moved in a similar manner as above described in relation to the head 26, by a double cam 94 which is mounted on the end of a shaft 95.

The shaft is journaled in a bearing 96 in the side 96 of the head 25 and in a bearing 97 in the side 96 of the head 26. A gear 99 is mounted on the shaft 95 and is in mesh with the gear 59 on the shaft 54, which interconnects the shafts and secures the actuation of both cams in an opposite direction when the handle 58 is rotated. When the handle 58 and cam 61 are revolved in a clockwise direction the jaws 46 in the head 26 are moved into clamping position and the shaft 95 and the cam 94 are rotated in a counter-clockwise direction for releasing the jaws 46 of the head 25.

A jaw spacing member 101, similar to the U-shaped spacing member 48, being substantially one-half thereof, is mounted in a slot in the side of the guiding member 91 for progressively moving all of the jaws 93 when actuated during the counter-clockwise movement of the cam 94, for spacing all of the jaws a predetermined distance from each other. The spacing member 101 is positioned on one side of the jaws only to leave the other side free for the passage of the broaching cutter 24 which machines a plurality of notches 103 in the side of the work piece 63 relative to the notch 87 in the end thereof. The broaching cutter 24 has a recessed body portion 102 in which a plurality of cutters 104 are supported in predetermined relation to each other relative to the notches 103 to be cut in the side of the work pieces. Different sets of cutting blades 104 are provided for machining slots 103 which are spaced different distances from each other from that illustrated in Fig. 6.

The notches on the shift rod employed in relation to the first and reverse speeds are positioned relative to each other a different distance from the notches provided on the shift rods employed in relation to the second and third speeds. It is, therefore, necessary to provide two different sets of broaching cutters 104 which are readily interchangeable to cut notches 103 in the rods 63 to be used in relation to either the first and reverse speed or the second and third speed. It is to be understood that the cutters 104 may be interchanged in the housing 102 or preferably a separate housing may be provided with the cutters therein and the housings substituted through the manipulation of the pin 22 which connects one end of the housing to the piston rod of the ram.

For adjusting the lateral position of the broaching cutter 24 I have provided a longitudinally adjustable plate 107 having slots therein in which the heads 108 of bolts 109 register to permit the frontwardly and the rearwardly movement of the plate. The plate is provided with a sloping surface which registers with the sloping surface on the guiding member 92 in the end of which a screw 111 is threaded and provided with a head 112 which registers in a notch 113 in the end of the plate 107. When the screw 111 is threaded into or out of the member 92, the plate 113 is adjusted frontwardly or rearwardly of the head 25 for adjusting the lateral position of the broaching cutter 24 to regulate the depth of the notches 103 machined in the sides of the work pieces or rods 63.

A supporting plate 66, similar to that employed with the head 26, is provided in the head 25 for engaging the bottom of the jaws 46 and for supporting the work pieces on the knife-edges 68 between which apertures 69 are provided. The work pieces are ejected through the apertures when the plate is moved rearwardly relative to the head, through the engagement of the arm 74 of the ram with the pin 72, projecting from the rod 71, which is attached to the plate.

To have the notches 103 aligned circumferentially relative to the notch 87 in the end of the rods 63, I have provided an adjusting plate 115 which is supported on the top of the head 25 by bolts 116. A recess 117 is provided centrally of the plate having projecting portions 118, the sloping surfaces of which engage the notches 87 in the end of the rods 63 which are rotated to have the edges of the notches retained in contiguous relation thereto when the jaws 93 are moved to clamp the rods in firm fixed position. Between the sloping surfaces 118, notches 119 are provided through which the work pieces are inserted to within the space between the clamping jaws 46, which are moved rearwardly with the jaws when actuated by the clockwise movement of the camming surface 62 of the cam 94 resulting in the circumferential adjustment of the rods as they move rearwardly relative to the sloping surfaces 118. The movement of the jaws 46 and the work pieces 63 is greater in the head 25 than in the head 26 for the purpose of effecting a sufficient lateral movement to all of the rods 63 to obtain their circumferential adjustment. For this reason an extra tenon 121 is provided on the end of the adjusting member 101 which moves the rearmost jaw 46 along with the clamping jaws to effect a lateral movement to the rod 63 which is positioned in the space between the rearmost jaws. For a similar reason the cam 94 has the surfaces 62 and 64 somewhat accentuated, over the curvature of the surfaces of the cam, to provide this greater movement frontwardly and rearwardly to the jaws 46.

Referring to Figs. 1 and 9, the operation of my broaching machine will now be described. When the rams 18 and 19 have been actuated by the fluid controlled through the valve 29, to have the piston 21 thereof moved forwardly in the ram 18 and rearwardly in the ram 19, as illustrated in Fig. 2, the machining operation on the head 26 has been completed while the broaching cutter 24 relative to the head 25 has been reciprocated into a position to effect a cutting operation. The rods provided with the notches 87, are inserted through the slots 119 in the head 25 and are retained on the knife supporting edges 68 of the plate 66 which has been adjusted to extend over the spaces between the jaws 46 through the engagement of the arm 74 with the pin 73 of the attached rod 71. The handle 58 is then turned in a counter-clockwise direction to release the work pieces in the head 26 and to clamp the work pieces in the head 25 in the manner referred to hereinabove effected by the opposite rotation of the shaft 54 and the shaft 95 through the engagement of the gears 59 and 99 thereof. The handle 34 of the valve 29 is then turned to reverse the flow of fluid and the movement of the piston 21 of the ram 19 to reciprocate the cutter 23 into forward position while the piston 21 of the ram 18 is moved rearwardly to draw the broaching cutter 24 across the work pieces to machine the notches 103 in the side thereof.

At the end of the forward stroke of the ram 19, the spaces between the jaws 64 of the head 26 are closed by the supports 68 of the plate 66 and the spaces between the jaws 46 of the head 25 are open because of the rearward movement of the plate 66 thereof effected by the engagement of the arm 74 with the extending pin 72. A plurality of rods 63 are positioned in the spaces between the clamping jaws 46 on the head 26 and the handle 58 is revolved in a clockwise direction to move the jaws into clamping relation with the work pieces 63.

This movement effects the counter-clockwise rotation of the shaft 95 which releases the jaws 46 of the head 25 and permits the rods 63 having notched ends to drop therefrom. The handle 34 is reversed and the cutters 23 and 24 are returned to the position illustrated in Fig. 1 by the movement of the piston into the positions shown in the figure. During this movement the broaching cutter 23 is drawn across the ends of the work pieces 63 in the head 26 for machining the notches 87 therein.

In Figs. 10 and 11, I have illustrated a finished rod 63 wherein notches 87 and 103 are provided in the top edge and the side body portion, respectively, of the rod. The notches 87 and 103 are slightly offset angularly relative to each other effected by the slope of the surface 118 of the adjusting plate 115. It is to be understood that the angular relation may be increased or decreased by changing the slope of the surfaces 118. It is to be further understood that the spacing of the notches 103 on the rods may be changed through the employment of a broaching cutter in which the cutting blades 104 are positioned in a different manner in the housing 102 from that illustrated in Fig. 6, which change is readily effected through the adjustment of the pin 22 which connects the broach to the ram.

By having the supporting member 68 of the plate 66 constructed in the form of a knife edge, assurance may be had that the rods 63 are properly adjusted in length, as it is practically impossible for shavings or other foreign matter to rest upon the edge of the support which might otherwise occur if the support was a flat surface.

While I have described and illustrated but a single embodiment of my invention, it will be apparent to those skilled in the art that various changes, omissions, additions and substitutions may be made therein without departing from the spirit and scope of my invention, as set forth in the accompanying claims.

I claim as my invention:

1. A machine for broaching notches in the end and side of a rod including, in combination, a reciprocal broaching cutter, a head having a chamber for receiving the rod, clamping means for said rod, an adjustable rest for engaging and positioning an end of the rod having a knife edge, and means for selectively positioning the knife edge rest to close and open the bottom of the chamber in accordance to the position of the broaching cutter.

2. A machine for broaching notches in the side of a rod relative to a notch in the end thereof including, in combination, a chamber for receiving and clamping the rod, means for engaging the notch and rotating said rod during the clamping operation into a predetermined circumferential position, and a broaching cutter for machining a notch in said rod after it has been positioned and clamped, a support for the end of said rod, and means actuated during the movement of the broach for shifting said support to close and open the bottom of said chamber.

3. A machine for broaching notches in the side of a rod relative to a notch in the end thereof including, in combination, a chamber for receiving and clamping the rod, positioning means for rotating said rod during the clamping operation, a broaching cutter for machining a notch in the side of said rod, an adjustable rest for positioning an end of the rod, and means for selectively positioning the rest to close and open one end of said chamber.

4. A machine for broaching notches in the side of a rod relative to a notch in the end thereof including, in combination, a chamber for receiving and clamping the rod, positioning means for rotating said rod during the clamping operation, a broaching cutter for machining a notch in the side of said rod, an adjustable rest for positioning an end of said rod, a drawbar for selectively positioning the rest to close and open one end of said chamber, and means for actuating said drawbar in accordance to the position of said broaching cutter.

5. A machine for broaching notches in the sides of a plurality of rods relative to notches in the end thereof including, in combination, a plurality of chambers for receiving and clamping the rods, positioning means for engaging the notches for rotating said rods during the clamping operation, a broaching cutter for machining a notch in the sides of said rods, an adjustable rest for positioning an end of the rods, and means for selectively positioning the rest to close and open one end of the chambers, actuated by the movement of said broach.

6. A machine for broaching a notch in the end of a rod and an additional notch in the side thereof relative to the first said notch including two heads having chambers for receiving and clamping a rod, two broaches simultaneously reciprocable in opposite directions through the actuation of a single control means, an adjustable rest associated with the end of each chamber for positioning an end of the rods, means actuated in accordance with the position of said broaches for selectively positioning said rests to close and open the end of said chambers, and common means for effecting the clamping of one chamber and the unclamping of the other chamber simultaneously.

7. A machine for broaching a notch in the end of a rod and an adjustable notch in the side thereof relative to the first said notch including, in combination, two heads having chambers for receiving and clamping a rod, two broaches simultaneously reciprocable in opposite directions, an adjustable rest associated with the end of each chamber for positioning an end of the rods, means for selectively positioning said rests to close and open said chambers in accordance to the positions of the broaching cutters, and means on one chamber acting on the notch cut in the rod in the first chamber for positioning the rod and the notch to be cut, relative to the first notch.

8. A machine for broaching notches in the end of rods and additional notches in the side thereof relative to the first said notch including, in combination, two heads having a plurality of chambers for receiving and clamping the rods, two broaches simultaneously reciprocable in opposite directions for alternately machining the said rods, adjustable rests associated with the bottom of the plurality of chambers for positioning the ends of the rods, and means actuated by the movement of the broaches for moving said rest to cover and uncover the bottom of the chambers in accordance to the position of the broaching cutters.

9. A broaching machine for cutting related notches in a plurality of members including, in combination, two rams, two broaches, one associated with each ram, means for simultaneously reciprocating the rams and broaches in opposite directions, two heads each provided with a plurality of chambers in which work pieces are clampable, control means for clamping the work pieces in one head and unclamping the work pieces in the other head when the latter work pieces have been machined, and means actuated by the movement of the broaches and rams for closing and opening the bottom of the chambers.

10. A broaching machine for cutting related notches in a plurality of members including, in combination, two rams, two broaches, one associated with each ram, means for simultaneously reciprocating the rams and broaches in opposite directions, two heads each provided with a plurality of chambers in which work pieces are clampable, control means for clamping the work pieces in one head and unclamping the work pieces in the other head when the latter work pieces have been machined, adjustable rests for closing the bottom of the chambers for retaining and positioning said work pieces, and means actuated by the movement of said rams and broaches for moving said rest from the bottom of said chambers after the work pieces have been machined.

WILLIAM A. HART.